US006861980B1

(12) United States Patent
Rowitch et al.

(10) Patent No.: US 6,861,980 B1
(45) Date of Patent: Mar. 1, 2005

(54) DATA MESSAGING EFFICIENCY FOR AN ASSISTED WIRELESS POSITION DETERMINATION SYSTEM

(75) Inventors: Douglas N. Rowitch, Del Mar, CA (US); Christopher Patrick, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/854,981

(22) Filed: May 26, 2004

(51) Int. Cl.⁷ .............................................. H04B 7/185
(52) U.S. Cl. ............................ 342/357.06; 342/357.06; 701/213
(58) Field of Search ..................... 342/357.01, 357.02, 342/357.06, 357.09; 701/213, 214, 215; 455/456.1, 456.2, 456.6

(56) References Cited

U.S. PATENT DOCUMENTS

| | | | | |
|---|---|---|---|---|
| 4,963,889 A | * | 10/1990 | Hatch | 342/357.08 |
| 5,572,218 A | * | 11/1996 | Cohen et al. | 342/357.06 |
| 6,236,359 B1 | * | 5/2001 | Watters et al. | 342/357.1 |
| 2003/0210656 A1 | * | 11/2003 | Biacs et al. | 370/252 |

* cited by examiner

Primary Examiner—Dao Phan
(74) Attorney, Agent, or Firm—Philip Wadsworth; Richard Bachand

(57) ABSTRACT

An assisted wireless position determination system includes a plurality of base stations and a plurality of wireless devices, such as mobile telephones and personal digital assistants, adapted to communicate with the base stations. The wireless position determination system also includes a position determination system for determining the geographic position of the wireless devices. The position determination system includes a position determination entity (PDE) that is connected to the base stations and serves as a processing server for computing the position of the wireless devices. The system and method reduces or eliminates redundant and superfluous data. In addition, the system and method ensure that the wireless device is not loaded with additional capacity, and that the wireless device is provided with precise location information. The embodiments of the system and method of the invention are compliant with the TIA/EIA IS-801 standard or other standards.

31 Claims, 5 Drawing Sheets

DATA MESSAGING EFFICIENCY FOR AN ASSISTED WIRELESS POSITION DETERMINATION SYSTEM

BACKGROUND OF THE INVENTION

1. Field of the Invention

The invention relates generally to position determination systems and methods, and, in particular, to systems and methods for efficiently messaging position-based data in an assisted wireless position determination system.

2. Description of the Related Art

Systems for determining the geographic position of a reference point are well known in the art. A commonly used position determination system is the Global Positioning System (GPS). GPS includes a network of Earth-orbiting satellites, spaced so that, at any given time and from any geographic position, at least four GPS satellites will be above the horizon.

In operation, each GPS satellite continually broadcasts its present position and current time. On Earth, a GPS receiver may use the information contained in these broadcast signals to compute its geographic position in terms of its longitude, latitude, and altitude. The GPS receiver typically searches for and collects the signals broadcast from four or more GPS satellites that are in view. Next, using the time interval between the broadcast time and reception time of each broadcast signal, the GPS receiver calculates the distance between the GPS receiver and each of the four or more GPS satellites. These distance measurements, along with the position and time information received in the broadcast signals, allow the GPS receiver to calculate its geographic position.

Both government regulation and consumer interest have driven the demand for geographic position functionality in wireless devices, such as wireless telephones. It is therefore desirable to introduce GPS functionality into a wireless device. However, wireless devices are extremely sensitive to network capacity and battery life considerations. Thus, adding a conventional GPS receiver to a wireless device for performing GPS functionality is an unsatisfactory solution for providing position location in the wireless device.

It is desired, therefore, to have a wireless system that provides GPS functionality to a wireless device with a minimum of additional cost to the network capacity and device battery life.

One such system for providing GPS functionality for a wireless device that minimizes the cost to the network capacity and device battery life is referred to as an "assisted wireless position determination system". In this system, a position determination entity (PDE) is typically part of a wireless communications network that includes a plurality of base stations and at least one wireless device or mobile station (MS). In the assisted wireless position determination system, the PDE is used to aid the MS in determining its position. The system may also be based on a standard regarding the connectivity architecture of devices in a wireless communication network. One such standard is the Telecommunication Industry Association Position Determination Service Standard for Dual-Mode Spread Spectrum System-Addendum (TIA/EIA IS-801-1).

Specifically, in an embodiment of an assisted wireless position determination system, a PDE continually tracks the positions of a plurality of GPS satellites through a network of stationary GPS receivers distributed across a coverage area of a wireless communication network. Before searching for the GPS signals, an MS transmits a request for GPS aiding information to the PDE through a local base station.

The PDE, in turn, provides the MS with the aiding information, such as ephemeris data and sensitivity assistance data for the GPS satellites. For example, the PDE may use the identity of the local base station to determine an approximate location of the MS and identities and positions of the GPS satellites that are likely to be in view of the wireless device. A drawback of this system is that the data sent from the PDE to the MS may be redundant or otherwise unneeded to provide precise location information for the MS. The redundant or the unneeded data increase bandwidth requirements and time needed to fix a geographic position of the MS.

Accordingly, it is desired to provide a system and method for interconnecting devices in an assisted wireless position determination system that will reduce or eliminate redundant and/or superfluous data, thereby reducing data bandwidth requirements and improving time to fix a location of a wireless device, while still ensuring that the wireless device is not loaded with additional cost. Moreover, it is desired that such a system and method will still provide enough positioning information for the wireless device to determine precisely its geographic position.

SUMMARY

System and method embodiments for providing position-related information to users, of wireless devices in an assisted wireless position determination system are disclosed. In one embodiment, the assisted wireless position determination system includes a plurality of base stations and a plurality of wireless devices, such as mobile telephones, personal digital assistants, or the like, adapted to communicate with the base stations.

The wireless position determination system further includes a system for determining the geographic position of the wireless devices. In the embodiment, a position determination entity (PDE) is connected to the base stations and serves as a processing site for providing satellite assistance to the wireless devices. More specifically, a system and method are provided for messaging communications between a PDE and a wireless device that reduce or eliminate the transmission of redundant or superfluous data. In addition, the system and method ensures that the wireless device is not loaded with additional cost and weight and that the wireless device is provided with a precise location information. The embodiments of the system and method are compliant with the TIA/EIA IS-801 standard and/or other standards.

In a further embodiment, a wireless position determination system includes a PDE and a wireless device, and a method is provided for messaging information between the PDE and the wireless device. The method includes receiving first aiding information from the PDE via a wireless communication link. A redundant satellite positioning signal is then determined based on the received first aiding information. A request for second aiding information based on the determined redundant satellite-positioning signal is then transmitted to the PDE via the wireless communication link. The requested second aiding information is received from the PDE via the wireless communication link. A necessary satellite positioning signal is then located from a positioning satellite based on the received second aiding information. A geographic position of the wireless device is then determined based on the located satellite positioning signal.

A method embodiment includes obtaining an Acquisition Assistance (AA). A shallow search for a first plurality of satellite positioning signals from a plurality of Global Positioning System (GPS) satellites is then performed based on the AA information. The first plurality of satellite positioning signals is then located from the plurality of GPS satellites using the shallow search. A determination is made on whether the first plurality of satellite positioning signals located by the shallow search have enough satellite positioning signals to yield an acceptable geographic position fix for the wireless device.

A request is transmitted for sensitivity assistance (SA) information for yielding a second plurality of satellite positioning signals from the plurality of GPS satellites if the first plurality of satellite positioning signals does not have enough signals to yield an acceptable fix for the wireless device. After receiving the requested SA information for the second plurality of satellite positioning signals, a deep search is performed for the second plurality of satellite positioning signals from the plurality of GPS satellites based on the received SA information.

Another determination is then made on whether the first plurality of satellite positioning signals located by the shallow search and the second plurality of satellite positioning signals located by the deep search have enough satellite positioning signals to yield the acceptable geographic position fix for the wireless device. If there are enough signals, then a determination is made on a geographic position fix for the wireless device based on the located first and second plurality of satellite positioning signals from the plurality of GPS satellites.

In yet another method embodiment, the method includes obtaining coarse time estimating information, coarse position estimating information, and Global Positioning System (GPS) almanac information. A first ephemeris for a positioning satellite is then checked to determine whether status information of the first ephemeris for the positioning satellite is less than a first time threshold.

A determination is then made on whether the positioning satellite is above a viewable horizon of a wireless device if the status of the first ephemeris is not less than the first threshold. A mask to request a second ephemeris for the positioning satellite from a position determination entity (PDE) is then made if the positioning satellite is above the viewable horizon of said wireless device. A request having the mask for the second ephemeris for the positioning satellite is then transmitted to the PDE. The PDE then transmits the second ephemeris to the wireless devices in order for the wireless device to determine its geographic position.

BRIEF DESCRIPTION OF THE DRAWINGS

In the drawings, components are not necessarily to scale. Like-reference numerals designate like or similar parts in the various figures.

DETAILED DESCRIPTION

Figure 1:
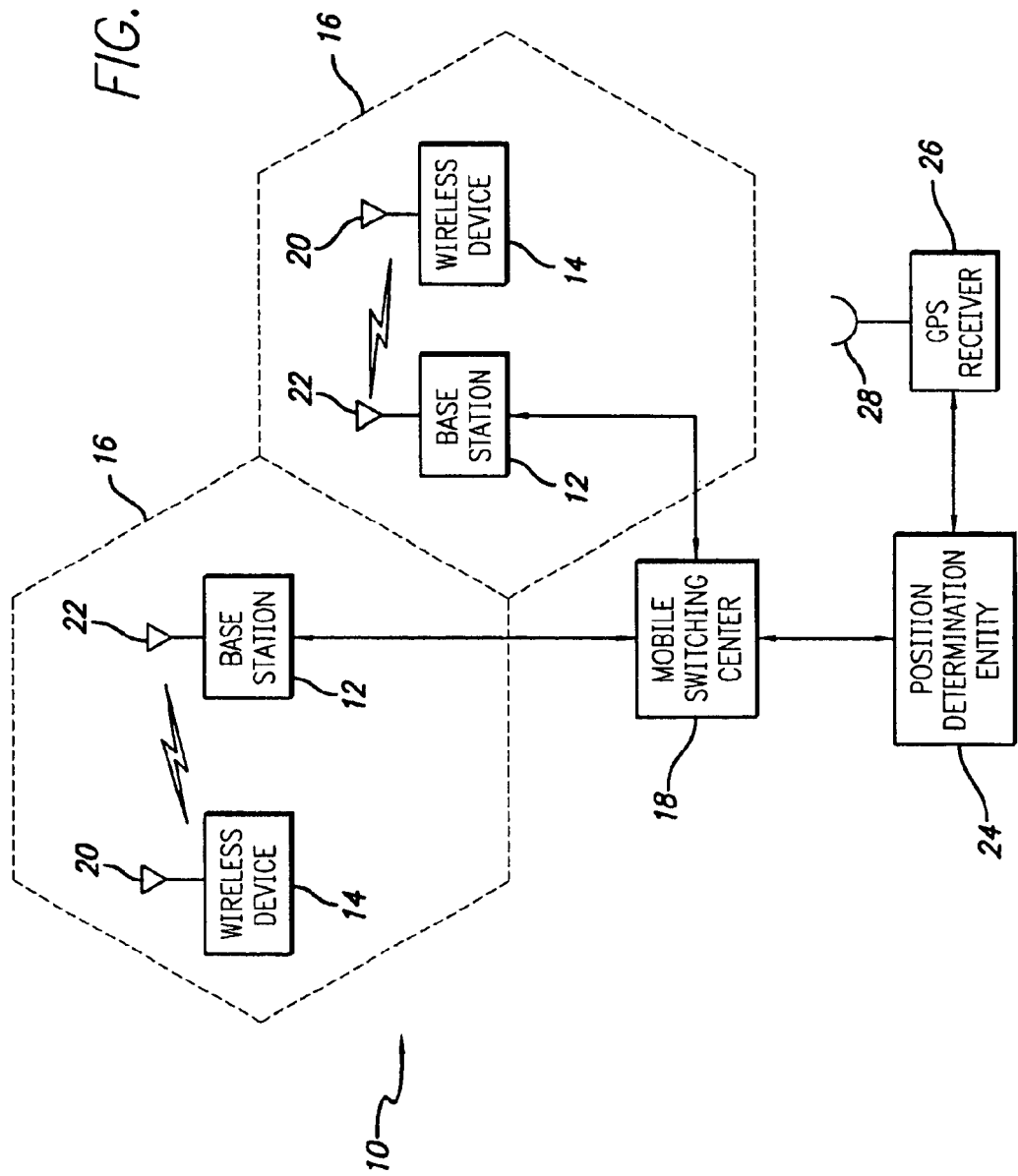
FIG. 1 is a block diagram illustrating a wireless communications system.

A system and method are shown for providing position-related information to a user of a wireless device or mobile station (MS). More specifically, a system and method are provided for interconnecting devices in an assisted wireless position determination system that will reduce or eliminate redundant data. In addition, the system and method ensure that the wireless device in the assisted wireless position determination system is not loaded with additional cost and weight, and that the wireless device is provided with precise location information. Moreover, embodiments of the system and method may be compliant with the TIA/EIA IS-801 standard and/or other standards.

In an assisted wireless position determination system as envisioned by certain embodiments, a base station having a stationary GPS receiver is maintained at a known position. The base station compares its GPS-calculated position to its known position and derives differential correction data for the GPS satellites that may be used to correct for detected errors in its GPS-calculated position. Errors in the GPS-calculated position may be caused by atmospheric and tropospheric conditions, errors in the satellite data, reception errors, and other error sources. The differential correction data may be transmitted to wireless or mobile devices having GPS functionality in the coverage area of the base station. By using the differential correction data in the GPS position calculations, the geographic position of the GPS receiver can be determined with added accuracy.

In addition, a wireless device or MS may further receive aiding information through a position determination entity (PDE) to assist the mobile device in locating the broadcast signals from the GPS satellites that are in view. The PDE continually tracks the positions of the GPS satellites that are in view and transmits the identities and positions of these GPS satellites, along with other aiding information such as the associated Doppler frequencies of the broadcast signals, to a wireless device in the coverage area of the base station. The aiding information informs the wireless device of the approximate location of the GPS satellites in view, thereby narrowing the required search window and significantly reducing the amount of time needed to acquire the GPS broadcast signals. Unassisted, the process of searching for even just four GPS satellite broadcast signals can take minutes because the mobile GPS mechanisms of most wireless devices lack accurate GPS satellite position information and, thus, lack information on where to look for the satellites in time and frequency.

Specifically, in one embodiment, the GPS signal acquisition time is reduced using a position determination entity (PDE). A PDE is typically part of a wireless communications network that includes a plurality of base stations and at least one mobile station (MS). The PDE continually tracks the positions of the GPS satellites through a network of stationary GPS receivers distributed across the coverage area of the wireless communications network. Before searching for the GPS signals, the MS transmits a request for GPS aiding information to the PDE through a local base station.

The PDE then transmits aiding information requested by the MS. For example, using the identity of the local base station, the PDE may determine the approximate location of the MS and provide the MS with the identities and positions of the GPS satellites that are likely to be in view, and the expected Doppler shift of each identified GPS signal. Typically, the real-time information compiled by the PDE is more precise than standard almanac data that may also be used and stored in the MS, and often results in a shorter GPS signal acquisition time.

The GPS signal acquisition time can be reduced even further in code division multiple access (CDMA) networks. In a CDMA network, each base station maintains a clock that is synchronized with the GPS time and that transmits a timing beacon to mobile devices in its coverage area. The mobile devices use the timing beacons to synchronize their internal clocks with the clock of the base station, but this synchronization is subject to propagation delay in the signal reaching the mobile devices.

The PDE and stationary GPS receivers also maintain clocks that are synchronized with the GPS time. In operation, the stationary GPS receivers track the times at which the beginning of each PN frame (e.g., 1023 chip PN code sequence) is received by the stationary GPS receiver. The PDE transmits the identities of the GPS satellites in view to the mobile device, along with the associated Doppler shift and associated PN frame reception time of each GPS signal. The mobile device may use this aiding information to identify the GPS satellites in view, the expected reception frequencies of the associated GPS signals, and the times at which the associated PN frames are expected to be received at the stationary GPS receiver. Using the received aiding information, the mobile device is able, for example, to quickly align, or correlate, its generated 1023 chip PN code sequence with a matching 1023 chip sequence from the received GPS signals (e.g., coherent integrating the signals), and improve its acquisition time to detect to the received GPS signals.

FIG. 1 illustrates a wireless communications system 10 embodiment in which a cell-based communication system including a plurality of base stations 12 and a plurality of wireless devices 14. Each base station 12 has an associated cell 16 defining a geographical coverage area serviced by the base station 12. Each wireless device 14 positioned within one of the cells 16 communicates with the associated base station 12 by exchanging data packets according to a pre-determined digital communications protocol, such as code division multiple access (CDMA).

The wireless devices 14 may be any devices capable of communicating with the base stations 12 over a wireless communications link, including mobile telephones, personal digital assistants (PDAs), vehicle navigation systems, portable computers, or the like. A mobile switching center (MSC) 18 manages the wireless communications in the cells 16, including call set-up, routing calls between wireless devices, and routing calls between wireless devices and at least one communications network, such as a public switched telephone network (PSTN) or the Internet. The wireless communications system 10 may include a plurality of MSCs, each managing a plurality of cells 16.

In alternate embodiments, the wireless communications system may be any wireless system that is adapted to transmit data to and from a wireless device. The system may include terrestrial or satellite based cellular communications systems, such as a cellular telephone system, a personal communication system, a specialized mobile radio system, an Advanced Mobile Phone System, a pager system, a wireless packet data system, or the like.

The wireless communications system 10 is further adapted to determine the geographic position of at least one wireless device (or MS) 14. In one embodiment, a satellite positioning system, such as the Global Positioning System (GPS), is used for position determination. Each MS or wireless device 14 includes at least one antenna 20 for communicating with a local base station 12, and for receiving GPS signals transmitted from orbiting GPS satellites (or SVs). Each base station 12 includes at least one antenna 22 for communicating with the MS 14. A position determination entity (PDE) 24 is connected to the base station 12 through the MSC 18 and assists the MS 14 in locating the GPS satellites that are in view and calculating the respective geographic positions of the MS 14. The MS 14 can either communicate with the PDE 24 via data burst messaging (DBM) or via TCP/IP. The DBM case is very infrastructure dependent and in the TCP/IP case, the MSC 18 is connected to an IWF or a PDSN to provide TCP/IP connectivity between the PDE 24 and the MS 14.

In a more specific embodiment, the PDE 24 is a computer system that tracks the location of the GPS satellites using at least one stationary GPS receiver 26, which receives GPS signals through a GPS antenna 28. The wireless communications system 10 preferably includes a network of GPS receivers 26 positioned throughout its coverage area. In one embodiment, each base station 12 includes a PDE 24 and stationary GPS receiver 26 for providing assistance to wireless devices 14 in the coverage area 16 of the base station.

A process for determining the geographic position of a wireless device will now be described with reference to the block diagram of FIG. 2. The PDE 132 continually tracks the positions of a plurality of GPS satellites 140 through a reference network 130, and maintains current information on each of the GPS satellites 140 in view. That is, the PDE 132 is connected to the reference network 130, such as a Wide Area Reference Network, having a plurality of GPS receivers 140 that provide almanac, ephemeris, and differential correction information to the PDE 132. The aiding information or data then flow from the PDE 132 to the MSC 134, in a DBM case, or to a PDSN (not shown) to the MSC 134. Then, from the MSC 134 the aiding data flow to the base station 112, for example, the BCS/BTS, and finally to the wireless device 114. In addition, the base station may have a GPS receiver 145. In one embodiment, the GPS receiver 145 is for time synchronization of a CDMA transmit signal and is not accessible by the PDE 132.

The process for determining the geographic position of the wireless device 114 can be initiated by the user of the wireless device 114. In alternate embodiments, the position determination process may also be initiated by the base station 112, the PDE 132, the MSC 134 or another device or entity connected to or part of the wireless communications system 10 shown in FIG. 1. After the position determination process is initiated, the wireless device 114 requests GPS aiding information from the PDE 132 through the base station 112. The PDE 132 identifies the GPS satellites 140 that are in view of the GPS receiver 130, and, with respect to the GPS receiver 130, determines the current position, the Doppler frequencies and pseudoranges of each of the identified GPS satellites 140 at specific GPS times. This GPS aiding information is transmitted to the wireless device 114 through the base station 112.

Because the wireless device 114 is in communication with, and therefore proximate to, the base station 112, this GPS aiding information can provide the wireless device 114 with the approximate positions of the GPS satellites 140 in view, significantly reducing the search range of the GPS satellite signals. Once the GPS satellite signals are acquired, the geographic position of the wireless device 14 may be determined in accordance with methods well known in the art.

As stated, certain embodiments are applicable in an assisted wireless position determination system that is also compliant with TIA/EIA IS-801. In an assisted wireless position system that is compliant with the TIA/EIA IS-801-1 standard, several deficiencies require the transmission of superfluous data. These needless transmissions increase session time and incur unnecessary data service fees by the carrier to end users. Accordingly, one embodiment provides a system and method for interconnecting devices in the assisted wireless position determination system that reduce or eliminate redundant data. The embodiment may be applicable to mitigate the TIA/EIA IS-801-1 deficiencies in either a future revision of the standard, or using TIA/EIA IS-801-1 standard compliant custom, or proprietary, messages.

However, a challenge presented in reducing the redundant or otherwise unneeded data that is transmitted in a positional determination system is to determine which data are truly redundant and which data are not and can actually contribute to the precision for determining location information for a wireless or mobile device. For example, although GPS satellite signals from four GPS satellites 140 can be used to determine the geographic position of the wireless device 114, GPS satellites signals from a greater number of GPS satellites 140 will provide an even more precise geographic position. That is, the more in-view GPS satellites 140 that are used to provide the GPS satellite signals, the more precise the geographic position of the wireless device 114 can be determined. Thus, in an embodiment, a system and method are provided to ensure that a wireless device in an assisted wireless position determination system is provided with all the necessary information on precisely determining location information for the wireless device.

Figure 2:
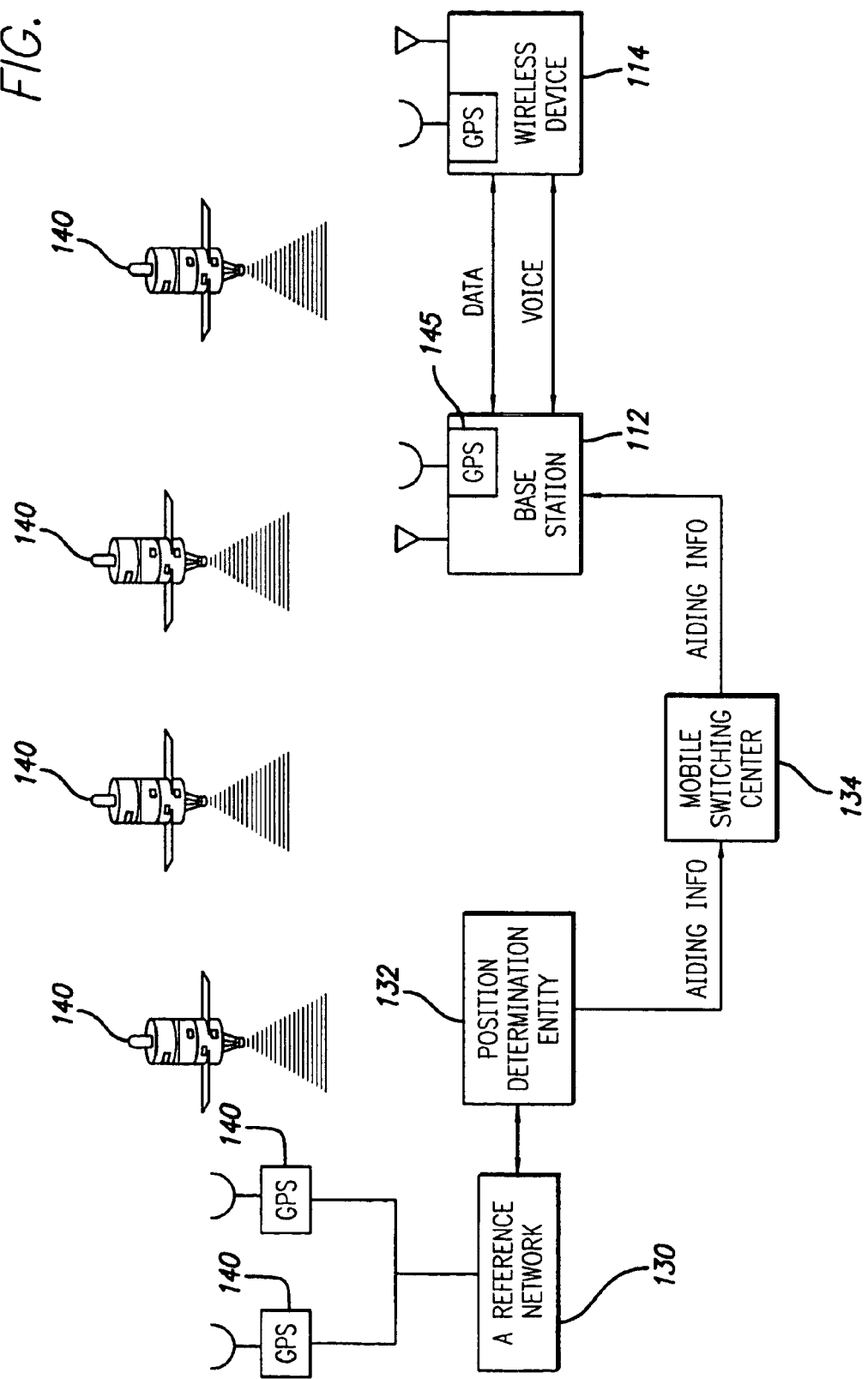
FIG. 2 is a block diagram illustrating an operation embodiment of the wireless communications system.

In a particular embodiment, a system and method is developed that focuses on two particular message types of aiding information or signals (e.g., the messages or aiding data sent from the PDE 132 to the wireless device 114 shown in FIG. 2). The two message types, namely Sensitivity Assistance information that is used in MS-Assisted mode of operation and GPS Ephemeris information that is used in MS-Based mode of operation, can be the most troublesome in terms of message size and frequency of trans mission. In the MS-Assisted mode, the PDE sends aiding data to the MS to perform a single-shot position fix; position calculations are performed within the PDE. In the MS-Based mode, the PDE sends ephemeris and almanac information to the MS, allowing the MS to perform multiple position fixes within the MS (e.g., the handset) until eventually ephemeris data refresh is required. Accordingly, the embodiment is applicable in both a MS-Assisted mode and a MS-Based mode of an assisted wireless position determination system. That is, the embodiments described can be implemented within an assisted wireless position determination system in which an MS or mobile can request Sensitivity Assistance (SA) data and GPS Ephemeris data from a PDE. The PDE transmits a Provide SA message in response to the request for SA data and a Provide Ephemeris message in response to the request for GPS Ephemeris data.

For example, in a MS-Based design system, the mobile frequently requests the Ephemeris data to obtain information about satellites that may just be rising above the horizon (or some set elevation mask). The requests are made frequently to ensure that the ephemeris database of the mobile will be as complete as possible in case the mobile drifts out of service (i.e., out of CDMA coverage) in which case it can no longer receive new ephemeris. The big shortcoming of this implementation is that the mobile will receive several redundant ephemeris updates for previously in view satellites. Assuming the almanac is available in the mobile, a crude estimate of the mobile position is available and that the mobile has a measure of system time, it can predict which satellites are (or will soon be) rising above the set elevation mask. Accordingly, in one embodiment, a new request message is developed for allowing the mobile to request GPS ephemeris for a specific set of satellites.

In addition, in a MS-Assisted design system, the Provide SA message that is provided by the PDE in response to the request from the mobile may include sensitivity bits for all satellites in view of the PDE reference network (e.g., the Wide Area Reference Network or the WARN of the PDE). Note that the SA bits are used to remove bit modulation on the incoming satellite signals such that coherent integration longer than twenty-millisecond bit duration may be performed. Longer coherent integration results in improved sensitivity. In the WARN of the PDE, the sensitivity bits includes 510 sensitivity bits plus some overhead fields included for each such satellite or Space Vehicle (SV). However, the MS, in many cases, does not need sensitivity bits for all satellites or SVs. For example, suppose an MS or mobile has a line of sight to one SV (e.g., through a window) and obstructed path to another SV (e.g., through a ceiling/roof). The mobile may be able to detect the first SV without SA and yet require the SA to detect the second SV. Accordingly, in another embodiment, a new request message is developed that allows the mobile to request SA for a specific set of satellites. However, the request message currently used for sensitivity assistance may not have modifying parameters. Thus, in a further embodiment, the PDE uses a plurality of default schemes to adjust the start time of the SA bit stream as well as the number of bits to send to a MS.

As will be further described below, other functions and features within an assisted wireless position determination system may be achieved. For example, the precision of location determinations may be enhanced, or the time needed for location determination, such as time to fix the position of the MS, may be reduced.

In an exemplary embodiment, a custom/proprietary message approach within the existing TIA/EIA IS-801-1 standard is developed. Alternatively, modified non-proprietary messages in a future version of TIA/EIA IS-801 may be used. In the case of the non-proprietary message approach, new request elements distinct from the existing SA and ephemeris requests would be added to the standard. However, in the custom/proprietary approach, additional fields would be added to the end of the existing SA and ephemeris request messages.

Position Determination Data Message (PDDM)

Specifically, in the TIA/EIA IS-801-1 standard compliant proprietary request message approach, an MS or mobile can request SV specific SA or SV specific Ephemeris. When requesting the SV specific SA or Ephemeris, the mobile will format a Position Determination Data Message (PDDM) except that the PD_MSG_TYPE header field is set to 192 (C0 hex), which identifies it as a proprietary message. Such requests should not be packaged with other conventional TIA/EIA IS-801-1 requests in the same PDDM. Furthermore, to be conservative, it is preferred that the proprietary and conventional PDDMs be sent in separate packets/data bursts.

The details of the above listed MS request elements and corresponding PDE response elements in the PDDMs of the more specific embodiment are further described below.

1. SV Specific GPS Sensitivity Assistance a. Request

The Request SV GPS Sensitivity Assistance Message includes the following record:

| Field | Length (bits) | Default Value | Notes |
|---|---|---|---|
| SV_MASK | 32 | | |
| MIN_REF_BIT_NUM | 11 | | |
| MIN_DR_SIZE | 8 | | |

SV_MASK - SV bit mask. This field specifies the subset of GPS satellites for which sensitivity assistance is requested. The least significant bit (bit 0) represents SV PRN 1. The most significant bit (bit 31) represents SV PRN 32. A bit value of '1' indicates that data is requested.
MIN_REF_BIT_NUM - Minimum requested reference bit number. This parameter conveys the position of a particular bit in the 1500 bit GPS frame to be called the "reference bit", which is the last bit of the first half of the NAV_MSG_BITS returned to the mobile in the corresponding response message. The mobile shall set this field to the requested position of the minimum reference bit in the range from 0 to 1499. This field should be used to indicate the earliest time for which sensitivity assistance can be useful in the mobile assuming no network delay. When setting the REF_BIT_NUM in the Provide Sensitivity Assistance message, the PDE shall select the maximum of the requested minimum reference bit number and the result of the internal algorithm for setting REF_BIT_NUM (modeled on network delay). Alternatively, if the mobile does not wish to specify a reference bit number, this field shall be set to 2047 and the PDE will use a default algorithm for selecting REF_BIT_NUM in the corresponding response message.
MIN_DR_SIZE - Minimum requested data record size per SV. Number of 2-bit pairs requested for each satellite, in the range 1 to 255. A value of 255, for example, indicates a request for 510 SA bits per SV. This field indicates the number of bits required for use and does not include padding to reflect the variance in network delay. The PDE shall send at a minimum the number of bits indicated by this field, but may increase the number of bits as a function of the variance in the network delay (not to exceed 510 bits total).

b. Response

When the PDE receives the above proprietary request, it responds with an unsolicited (TIA/EIA IS-801-1) Provide GPS Sensitivity Assistance message. However, in the response message, the PDE prunes data for any SV not requested in the SV_MASK field of the request message. If MIN_REF_BIT_NUM is set to 2047, the PDE sets the MIN_REF_BIT_NUM in response message using a default algorithm (call this result DEFAULT_REF_BIT_NUM). If, alternatively, MIN_REF_BIT_NUM is in the range 0 through 1499, the PDE sets the REF_BIT_NUM in the response message to MAX(DEFAULT_REF_BIT_NUM, MIN_REF_BIT_NUM). For the number of bits in the SA response, the PDE responds with at least MIN_DR_SIZE bit pairs. The PDE may further pad this value to account for variance in the network delay (e.g., take max delay−min delay, determine the number of bits and used this to pad). The DR_SIZE plus the pad figure. If the PDE does not have any SA data for any of the requested SVs, or there is some other reason it cannot comply with the request, it sends a proprietary reject message.

2. SV Specific GPS Ephemeris a. Request

The Request SV GPS Ephemeris message includes the following record:

| Field | Length (bits) | Default Value | Notes |
|---|---|---|---|
| AB_PAR_REQ | 1 | 1 | |
| SV_MASK | 32 | | |

AB_PAR_REQ - Alpha/Beta parameters requested. If Alpha/Beta parameters are requested, the mobile station shall set this field to '1'; otherwise the mobile station shall set this field to '0'.

-continued

| Field | Length (bits) | Default Value | Notes |
|---|---|---|---|

SV_MASK - SV bit mask. This field specifies the subset of GPS satellites for which ephemeris is requested. The least significant bit (bit 0) represents SV PRN 1. The most significant bit (bit 31) represents SV PRN 32. A bit value of '1' indicates that data is requested.

b. Response

When the PDE receives the above custom request, it responds with an unsolicited (TIA/EIA IS-801-1) Provide GPS Ephemeris message. However, in this response message, the PDE prunes data for any SV not requested for any SV not requested in the SV_MASK field of the request message. If the PDE does not have any ephemeris data for any of the requested SVs, or if there is some other reason it cannot comply with the request, it sends a reject message.

In addition, in one embodiment, if the above requests are applied to the existing request messages for SA and ephemeris and sent to a legacy PDE, the PDE can ignore the new fields added to the existing requests and simply send the conventional response with the legacy messages. Moreover, an MS embodiment can be configured to first send a custom request message and then, if the message is rejected, send a legacy request message (which may be especially useful when the MS is roaming between networks, or networks supporting many PDEs, some of them may be legacy PDEs). Further, embodiments can be implemented within a software program for the mobile and/or the PDE.

SV Specific SA

In a particular MS-Assisted mode system, an MS in this MS-Assisted system is configured with the following features. The features (if enabled on the MS) include a GPS search scheduler and a Session Manager (SM). The GPS scheduler determines when a deep mode search is required (i.e., a search that requires SA data) and then computes a mask of specific SVs (e.g., SV PRNs) that require deep mode (and thus SA data). The mask is then passed up to the SM of the MS. The SM in turn formats the new request into a PDDM (e.g., as a message specified in the tables for MS request elements). In one embodiment, the M_REF_BIT_NUM field of the PDDM can be set to 2047 and the MIN_DR_SIZE field can be set to 255 for backward compatibility. In another embodiment, these fields can also be optimized, possibly in an adaptable fashion, to improve performance further. In yet another embodiment, the SM decides which request needs be customized.

In addition, the above MS embodiments may be particularly useful for wireless systems that utilize a DBM transport since DBM implementations tend to exhibit throughput substantially worse than TCP/IP transport. For example, in conventional DBM wireless networks, turn around times from initial SA request to complete reception of the SA response can average around 6 seconds. However, the amount of improvements to the turn around time depends on the different signal conditions that the MS may encounter. It may be that all SVs are found in a shallow search mode by the MS such that deep mode is unneeded (e.g., clear sky, unobstructed). In such cases, no SA will be requested. Similarly, in deep indoor scenarios, it could be no SVs are found in the shallow search such that SA data is still required for all SVs. However, there will be marginal scenarios where some SVs have strong enough signals that they do not require the deep search. In such cases, SA data will only be requested for a subset of the SVs and this change will significantly reduce the transmission of superfluous data.

Figure 3:
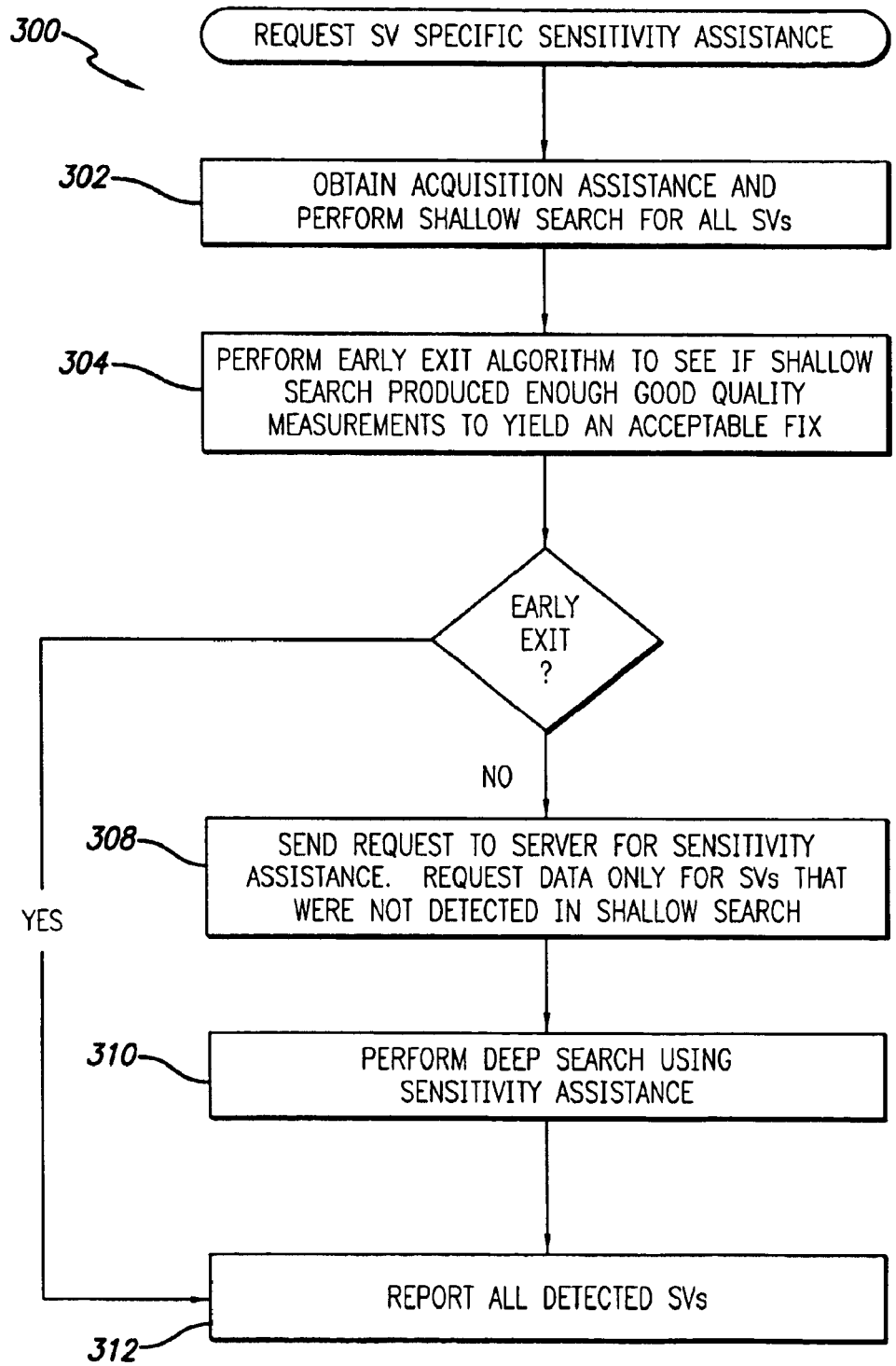
FIG. 3 is a flow diagram illustrating exemplary steps of a method embodiment.

Referring now to FIG. 3, an exemplary method 300 for requesting SV Specific Sensitivity Assistance (SA) is shown in FIG. 3. At step 302, the method 300 obtains Acquisition Assistance (AA) and performs a shallow search for all SVs. The method 300 then moves to step 304 and performs an early exit algorithm to determine whether the shallow search produced enough good quality measurements to yield an acceptable location fix (e.g., of a MS). If the shallow search is determined to provide an acceptable fix, the method 300 moves to step 312 and reports all detected SVs. If the shallow search is determined to not provide an acceptable fix, the method 300 moves to step 308 and sends a request to a server (e.g., a PDE) for sensitivity assistance. In step 308, the request only asks for SA data for SVs that were not detected in the shallow search (e.g., requesting for SV Specific SA). The method 300 then moves to step 310 and performs a deep mode search using the SA data. The method 300 shown in FIG. 3 may be performed by various mechanisms in assisted wireless position determination systems, and may contain other known position determination steps.

Particularly, in a more specific first MS-Assisted mode system embodiment, the conventional request for SA data is replaced by a new proprietary request. In the search scheduler, after shallow mode completes, an early exit algorithm is executed. If it is determined that a deep mode search is required and there is "time" enough to perform the deep mode search (this computation may be based on QoS/PRQ settings for the session), then the search scheduler formats a SV specific SA request message. Since in certain embodiments there is a capability to re-request SA data if the previous SA data expires, the algorithm should handle the case for SVs that have already been searched in the deep mode.

To determine the SV mask, the search scheduler performs a set of exemplary functions represented by the following pseudo function code that may be embedded in a computer readable medium in accordance with an embodiment:

```
REQ.SV_MASK = 0
loop (i over satellites in AA)
    p = AA[i].prn - 1 # 0 ... 31
    # don't request SA for cases where we have good shallow mode meas
        if (ith meas in shallow mode above strong thresh)
continue
        # must be no meas or weak shallow mode meas for this SV;
if we've
        # already searched this SV in deep mode, then don't request SA
        if (done searching ith satellite in deep mode) continue
        # if we get here, then we must need SA for this SV
        set pth bit in REQ.SV_MASK
    end loop (over satellites)
    REQ.MIN_REF_BIT_NUM = 2047    # let the PDE decide when to start bits
    REQ.MIN_DR_SIZE = 255          # request full 510 bits just as before
```

Based on the settings (MIN_REF_BIT_NUM and MIN_DR_SIZE), the PDE should respond with a GPS SA message identical to what it conventionally sent, but with some of the SVs pruned. If the PDE does not have SA bits for some of the requested SVs, it should then exclude those SVs as well in the response message. The PDE can also optionally use the time tag of the forward link message to model network delay.

There are three cases where data bandwidth can be saved in the above specific first MS-Assisted mode system embodiment:

1. Already found strong measurement in shallow mode;
2. Re-requesting SA data and already done searching an SV in deep mode; and
3. Do not need SA data for newly risen satellite that was not in Acquisition Assistance (AA) data.

Ideally, the above embodiment should have no loss in accuracy and an improvement in time-to-fix over a conventional system in either: an outdoor, horizon-obstructed case, an outdoor, obstructed case, and a good indoor case. In the horizon-obstructed case, the MS has a good visibility, 360°, but obstructions, like trees or buildings, exist such that several SVs are not visible at an angle of between about 5°–15° in elevation). In the outdoor, obstructed case, the MS, for example, the handset, should have some unobstructed clear sky visibility and a large degree of complete obstruction, ideally 1–2 meters from a tall concrete and steel building. In the good indoor case, the handset should be positioned close to a window, such that 2-3 line-of-sight satellites are typically in view.

Figure 4:
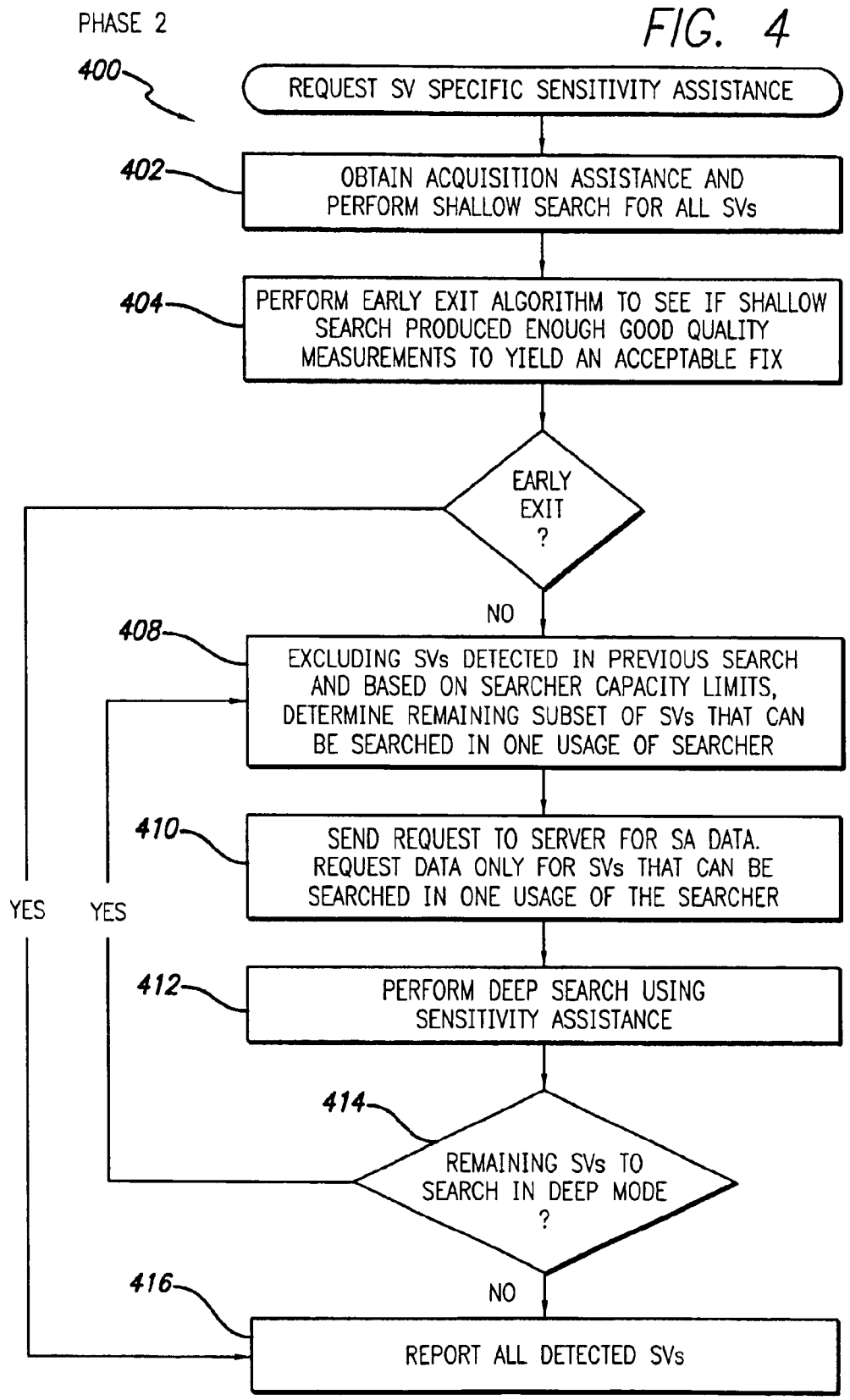
FIG. 4 is a flow diagram illustrating exemplary steps of another method embodiment.

Referring now to FIG. 4, another method, such as exemplary method 400 for requesting SV Specific Sensitivity Assistance (SA) is provided. At step 402, the method 400 obtains Acquisition Assistance (AA) and performs a shallow search for all SVs. The method 400 then moves to step 404 and performs an early exit algorithm to determine whether the shallow search produced enough good quality measurements to yield an acceptable MS location fix. If the shallow search is determined to provide an acceptable fix, the method 400 moves to step 416 and reports all detected SVs. If the shallow search is determined not to provide an acceptable fix, the method 400 moves to step 408 for excluding SVs detected in shallow search and excluding SVs based on searcher capacity limits.

Step 408 also determines a remaining subset of SVs that can be searched in one usage of the searcher (e.g., the searcher in the MS). The method 400 then moves to step 410 and sends a request to a server (e.g., a PDE) for SA data. In step 410, the request only ask for SA data for the remaining subset of SVs that can be searched in the one usage of the searcher (e.g., requesting for SV Specific SA). Afterward, the method 400 moves to decision step 414 to determine whether there are any remaining SVs to be searched in a deep mode. If there are no remaining SVs to be deep mode searched, the method 400 moves to step 416 and reports all detected SVs. If there are remaining SVs to be deep mode searched, the method 400 moves back to step 408.

Particularly, in a more specific second MS-Assisted mode system embodiment, the conventional request for SA data is replaced by this new proprietary request. In this embodiment, the search scheduler executes an early exit algorithm, after a shallow mode search has been completed. If it is determined that a deep mode search is required and there is "time" enough to perform a deep mode computation, then the search scheduler formats a SV specific SA request message.

The main distinction from the embodiment and the specific first MS-Assisted mode system embodiment is that the second embodiment only requests data for satellites that the embodiment plan searches in the upcoming search invocation (as opposed to all SVs that require deep search). The second distinction is that the second embodiment can request less than 10 seconds of data and the amount of data requested is adapted intelligently. Accordingly, this embodiment will request SA data once before each deep mode search. The embodiment may also perform the early exit algorithm after each deep mode searcher invocation to see if the number of measurements obtained thus far meets the sufficiency criteria.

Accordingly, the search scheduler of the more specific second MS-Assisted mode system embodiment should perform a set of exemplary functions represented by the following pseudo function code that may be embedded in a computer readable medium in accordance with an embodiment:

```
REQ.SV_MASK = 0
loop (i over satellites in AA)
    p = AA[i].prn - 1 # 0 . . . 31
    # don't request SA for cases where we have good shallow
mode meas
    if (ith meas in shallow mode above strong thresh)
continue
    # must be no meas or weak shallow mode meas for this SV;
if we've
    # already searched this SV in deep mode, then don't
request SA
    if (done searching ith satellite in deep mode) continue
    # skip any satellite that we can't search in this visit
    if (searcher can't get to ith satellite in this visit)
continue
    # if we get here, then we must need SA for this SV
    set pth bit in REQ.SV_MASK
end loop (over satellites)
```

In this embodiment, there is a fourth case (as opposed to just three cases in the more specific first MS-Assisted mode system embodiment) where data bandwidth can be saved as indicated below:
1. Already found strong measurement in shallow mode;
2. Re-requesting SA data and already done searching an SV in deep mode;
3. Do not need SA data for newly risen satellite that was not in AA data; and
4. Requesting SA data and searcher cannot get to SV in next GPS searcher invocation.

SV Specific Ephemeris

Figure 5:
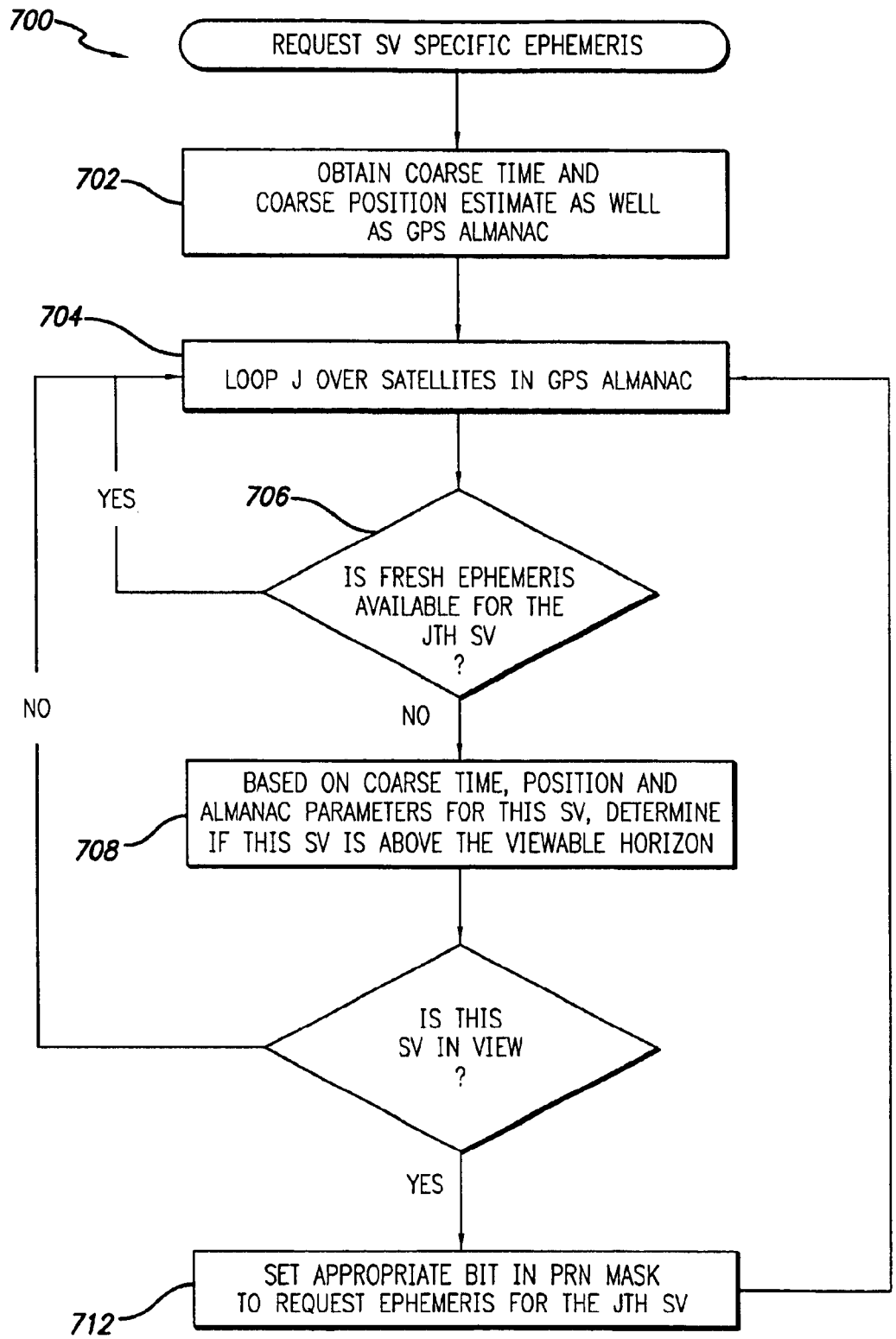
FIG. 5 is a flow diagram illustrating exemplary steps of yet another method embodiment.

Referring now to FIG. 5, an exemplary method 700 for requesting SV Specific Ephemeris is provided. At step 702, the method 700 obtains a coarse time estimate, a coarse mobile position estimate and GPS Satellite Almanac data for all SVs. The coarse time estimate can be derived from CDMA time. The coarse position estimate can be based on previous position solution for a wireless device that is utilizing the current method. The GPS Satellite Almanac can be already stored in, or downloaded to, the wireless device. At decision 706, the method 700 checks ephemeris data for a SV (e.g., a Jth SV) in a plurality of SVs (e.g., 32 SVs) to determine if the ephemeris for the SV is "fresh". Ephemeris data is consider "fresh" (i.e., not "stale") if the age of ephemeris data is less than an amount of time where the ephemeris remains constant and does not change, and an amount of time to maintain a minimal accuracy requirement. The age of the ephemeris data may be, for instance, a status having a time of validity period or a time of last refreshment. If the ephemeris for the SV (e.g., the Jth SV) is determined not to be "fresh", the method loops back to step 704 and to check ephemeris data for another SV in the plurality of SVs.

If the ephemeris data for the SV is determined not to be "fresh", or if no ephemeris data is available for the Jth SV, the method moves to step 708. In step 408, a determination is made whether the SV is above the viewable horizon, based on the coarse time, position, and almanac parameters for the SV, such as the viewable horizon of a wireless device utilizing this method. If the SV is determined to be viewable, the method 700 moves to step 712 and sets an appropriate bit in a mask, such as a SV PRN mask, to request the ephemeris for the SV. If the SV is determined not to be in view, the methods loops back to step 704 to check ephemeris data for another SV. In addition, if not all the SVs in the plurality of SVs have been either masked or determined to be in view, the method loops back to step 704.

In a particular MS-Based mode system embodiment, an MS in the MS-Based mode system requests ephemeris whenever a fix is required subject to a time threshold (T1) that is imposed to ensure a minimum interval between ephemeris requests. This time threshold may be set in the range of 30 to 120 minutes, where smaller thresholds correspond to smaller WARN networks. In this embodiment, ephemeris data transmitted from any GPS satellite should be constant over a two-hour period. To support minimal accuracy requirements, at least the current ephemeris data, or the ephemeris data from the previous two-hour interval should be available for a given satellite.

Thus, for example, a default value of four hours could be used for T2 (i.e., two hours with no change and another two hours for the minimal accuracy requirement), although other values for T2 are possible. Thus, if T1 is set to 30 minutes and T2 is set to four hours, the ephemeris could be unnecessarily updated seven out of eight times for a given satellite. The MS includes a Position Engine (PE). With the SV specific ephemeris request, the PE formats a SV_MASK for ephemeris data. There are two cases (or modes) of operation for the PE: Case (A): there is no stored ephemeris or all stored ephemeris is stale; case (B): there is valid (non-stale) ephemeris for one or more SVs. Moreover, in the context of this embodiment, ephemeris for an SV is considered "stale" if a certain amount of time (T2) has elapsed since the time of validity of that ephemeris data (e.g., the time of last refreshment from the PDE).

For case (A), the PE will set the SV_MASK to 65535 (FFFF in hex), since ephemeris data is required for all SVs that are visible to the PDE.

For case (B), the PE will perform two tasks. First, it will determine if any stored ephemeris is stale (e.g., by checking a state of the stored ephemeris). For any such SVs, if they are still in view (e.g., by consulting the almanac to compute a coarse position of the satellite, if the satellite is still above the set elevation mask, then it is considered in view), then the corresponding bits will be set to "1" in the SV_MASK. Second, the PE shall determine the set of SVs that have recently risen or are about to rise above the elevation mask (e.g., based on almanac computations). For these SVs, bits in the SV_MASK will be set accordingly.

Note, this MS-Based mode system embodiment, or an alternate embodiment, could avoid case (A) entirely, and require consideration of only consider case (B) by simply flagging all SVs as having stale ephemeris. However, if the ephemeris database is empty, it is a waste of time performing almanac calculations to determine which satellites are in view. It suffices to request all ephemeris data available to the reference network and thus avoid the required computation of case (B).

Regardless, the composite SV_MASK can be passed up to an SM. If the previous SM SV specific request for ephemeris was at least T1 or more seconds ago, then the SM will format and transmit the SV specific ephemeris request specified as a PDDM as described in the tables above. No other changes are required in the MS software. Note that since redundant data is no longer transmitted, T1 can be substantially reduced without increasing the data transmitted. This reduction in T1 should improve ephemeris availability and its precision for determining position.

To illustrate the benefits of the above MS-Based mode system embodiment, suppose, for example, there are always ten satellites in view (occasionally some falling below the elevation mask and others rising) and suppose that ephemeris data is valid for four hours (T2=4 hours). Then using the conventional ephemeris request, say with T1 set to one hour, will require 542 bytes/hour. If T1 is set to the minimum value of 30 minutes, then 1084 bytes/hour will be required. With this embodiment, the data throughput is reduced to 136 bytes/hour. If T2 is increased to 6 hours, then the data requirements drop further to 90 bytes/hour. With this new scheme, T1 can now be reduced without penalty to keep the ephemeris database as up to date as possible. Note that T1 should also not be set too low, or there will never be more than one SV worth of ephemeris data per response message. Thus, constants T1 and T2 should be optimized as part of a system study. For example, T1 and T2 can be optimized by considering if carriers charge on a per packet basis and/or if multiple SVs worth of ephemeris data can be stored in a single packet.

In an alternative particular MS-Based mode system embodiment, an MS can just simply compute a mask of all SVs for which it has valid ephemeris data, invert the mask, and provide that to the SM. However, in this alternative embodiment, there may be issues with large WARN networks. One issue, for instance, is getting too much ephemeris data with very little improvement to precision.

Having thus described embodiments of a system and method for improving data messaging efficiency for an assisted wireless position determination system, it should be appreciated that various modifications, adaptations, and alternative embodiments thereof may be made. For example, the concepts described may be used to enhance the services offered by other position determination systems, other than a GPS system. The concepts described may be used to enhance other messages within such position determination system. Moreover, it should be appreciated that contemplated embodiments can be adapted to a GPS Sensitivity Assistance message used in an MS-Assisted mode system, a GPS Ephemeris message used in an MS-Based mode system, and a GPS aiding message used in an assisted wireless position determination system.

What is claimed is:

1. A method for messaging position-based information in an assisted wireless position determination system, comprising:
   receiving first aiding information from a position determination entity (PDE) via a wireless communication link;
   determining a redundant satellite positioning signal based on said received first aiding information;
   transmitting a request for second aiding information based on said determined redundant satellite positioning signal to said PDE via said wireless communication link;
   receiving said requested second aiding information from said PDE via said wireless communication link;
   locating a necessary satellite positioning signal from a positioning satellite based on said received second aiding information; and
   determining a geographic position based on said located satellite positioning signal.

2. The method of claim 1 wherein said transmitted request for said second aiding information reduces a bandwidth requirement of said second aiding information.

3. The method of claim 1 wherein said transmitted request for said second aiding information reduces an amount of time needed to determine said geographic position.

4. The method of claim 1 wherein said first aiding information from said PDE via said wireless communication link comprises acquisition assistance (AA) information for performing a shallow search for a plurality of positioning satellites.

5. The method of claim 4 wherein said determining said redundant satellite positioning signal based on said received first aiding information comprises:
   locating a plurality of satellite positioning signals from said plurality of positioning satellites based on said AA information and said shallow search for said plurality of positioning satellites; and
   performing an early exit algorithm to determine whether said shallow search for said plurality of positioning satellites produces enough satellite positioning signals to yield an acceptable geographic position fix.

6. The method of claim 5 wherein said second aiding information comprises only aiding information for searching an undetected satellite positioning signal from a positioning satellite of said plurality of positioning satellites.

7. The method of claim 6 wherein said locating said necessary satellite positioning signal from said positioning satellite based on said received second aiding information comprises:
   performing a deep searching for said undetected satellite positioning signal from said positioning satellite of said plurality of positioning satellites based on said second aiding information.

8. The method of claim 7 wherein said necessary satellite positioning signal comprises a satellite positioning signal equivalent to said undetected satellite positioning signal.

9. The method of claim 5 wherein said determining said redundant satellite positioning signal based on said received aiding information further comprises:
   excluding a positioning satellite of said plurality of positioning that has already provided a detected satellite positioning signal.

10. The method of claim 5 wherein said determining said redundant satellite positioning signal further comprises:
    excluding a positioning satellite of said plurality of positioning based on a capacity limit of a wireless device.

11. The method of claim 5 wherein said determining said redundant satellite positioning signal further comprises:
    determining a positioning satellite of said plurality of positioning that can be searched in a usage for determining said geographic position.

12. The method of claim 5 wherein said determining said redundant satellite positioning signal further comprises:
    excluding a first positioning satellite of said plurality of positioning satellites that has already provided a detected satellite positioning signal; and
    excluding a second positioning satellite of said plurality of positioning satellites that cannot be used on a usage for determining said geographic position.

13. The method of claim 12 wherein said necessary satellite positioning signal comprises a positioning signal from a third positioning satellite of said plurality of positioning satellites.

14. The method of claim 13 wherein said positioning signal from said third positioning satellites is located by performing a deep search based on said second aiding information.

15. The method of claim 5 wherein said second aiding information comprises only aiding information for searching an undetected satellite positioning signal from a positioning satellite of said plurality of positioning satellites and wherein said undetected satellite positioning signal can be used on a usage for determining said geographic position.

16. The method of claim 1 wherein said first aiding information comprises one of a coarse Global Position System (GPS) time estimate, a coarse geographic position estimate, and a GPS almanac.

17. The method of claim 16 wherein said coarse GPS time estimate can be derived from a code division multiple access (CDMA) time.

18. The method of claim 16 wherein said determining said redundant satellite positioning signal comprises:
determining a freshness of ephemeris data for a first positioning satellite based on said first aiding information.

19. The method of claim 18 wherein said determining said redundant satellite positioning signal further comprises:
determining a viewability of said first positioning satellite based on said coarse Global Position System (GPS) time estimate, said coarse geographic position estimate, and said GPS almanac.

20. The method of claim 19 wherein said determining said redundant satellite positioning signal further comprises:
setting a mask for said request for said second aiding information.

21. The method of claim 20 wherein said mask ensures that said second aiding information comprises a new ephemeris for said first positioning satellite from said PDE via said wireless communication link and reduces a bandwidth requirement of said second aiding information.

22. The method of claim 18 wherein said freshness of said ephemeris of said first positioning satellite is determined by a first time threshold and a second time threshold.

23. The method of claim 22 wherein said second time threshold comprises:
a first time period where said ephemeris of said first positioning satellite remains constant, and
a second time period based on a minimal accuracy requirement for determining said geographic position.

24. The method of claim 22 wherein said first time threshold can be reduced without increasing said bandwidth requirement of said second aiding information.

25. The method of claim 1 wherein said determining said redundant satellite positioning signal comprises:
determining a validity of ephemeris data for a first positioning satellite based on said first aiding information;
setting a mask for said ephemeris for said first positioning satellite if said ephemeris for said first positioning satellites is determined to be valid;
inverting said mask; and
providing said inverted mask to said request for said second aiding information.

26. The method of claim 1 wherein said determined geographic position comprises a geographic position of a mobile telephone in said assisted wireless position determination system and wherein said PDE comprises a Global Positioning System (GPS) receiver.

27. The method of claim 26 wherein said assisted wireless position determination system comprises a mobile station (MS) assisted mode and wherein said PDE performs all positioning calculations for said mobile telephone.

28. The method of claim 26 wherein said assisted wireless position determination system comprises a mobile station (MS) base mode and wherein said second aiding information comprises ephemeris for allowing said mobile telephone to perform said locating said necessary satellite positioning signal from said positioning satellite based on said received second aiding information and said determining said geographic position based on said located satellite positioning signal.

29. A method for messaging position-based information in an assisted wireless position determination system, the method comprising:
obtaining Acquisition Assistance (AA) information;
performing a shallow search for a first plurality of satellite positioning signals for a plurality of Global Positioning System (GPS) satellites based on said AA information;
locating said first plurality of satellite positioning signals from said plurality of GPS satellites based on said shallow search;
determining whether said first plurality of satellites positioning signals located by said shallow search have enough satellite positioning signals to yield an acceptable geographic position fix for a wireless device;
transmitting a request for sensitivity assistance (SA) information for yielding a second plurality of satellite positioning signals from said plurality of GPS satellites if said first plurality of satellites positioning signals do not have enough satellite positioning signals to yield said acceptable geographic position fix for said wireless device;
receiving said requested SA information for yielding said second plurality of satellite positioning signals from said plurality of GPS satellites;
performing a deep search for said second plurality of satellite positioning signals from, said plurality of GPS satellites based on said received SA information;
locating said second plurality of satellite positioning signals from said plurality of GPS satellites based on said deep search;
determining whether said first plurality of satellites positioning signals located by said shallow search and said second plurality of plurality of satellite positioning signals located by said deep search have enough satellite positioning signals to yield said acceptable geographic position fix for said wireless device; and
determining said geographic position fix for said wireless device based on said located first and second plurality of satellite positioning signals from said plurality of GPS satellites if said first and second plurality of satellites positioning signals do have enough satellite positioning signals to yield said acceptable geographic position fix for said wireless device.

30. A method for messaging position-based information in an assisted wireless position determination system, the method comprising:
obtaining coarse time estimating information, coarse position estimating information, and Global Positioning System (GPS) almanac information;
checking a status of a first ephemeris for a positioning satellite;
determining whether said status of said first ephemeris is less than a first time threshold;
determining whether said positioning satellite is above a viewable horizon of a wireless device if said status is not less than said first time threshold;
setting a mask to request a second ephemeris for said positioning satellite from a position determination entity (PDE) if said positioning satellite is above said viewable horizon of said wireless device and said status is not less than said first time threshold;
transmitting a request having said mask for said second ephemeris for said positioning satellite to said PDE if said positioning satellite is above said viewable horizon of said wireless device and said status is not less than said first time threshold;

receiving said requested second ephemeris for said positioning satellite from said PDE if said positioning satellite is above said viewable horizon of said wireless device and said status is not less than said first time threshold;

locating a satellite positioning signal from said positioning satellite based on said second ephemeris for said positioning satellite if said positioning satellite is above said viewable horizon of said wireless device and said status is not less than said first time threshold; and determining said geographic position for said wireless device based on said located satellite positioning signal from said positioning satellite if said positioning satellite is above said viewable horizon of said wireless device and said status is not less than said first time threshold.

31. A system for messaging position-based information in an assisted wireless position determination system, comprising:

means for receiving first aiding information from a position determination entity (PDE) via a wireless communication link;

means for determining a redundant satellite positioning signal based on said received first aiding information;

means for transmitting a request for second aiding information based on said determined redundant satellite positioning signal to said PDE via said wireless communication link;

means for receiving said requested second aiding information from said PDE via said wireless communication link;

means for locating a necessary satellite positioning signal from a positioning satellite based on said received second aiding information; and means for determining a geographic position based on said located satellite positioning signal.

* * * * *